United States Patent [19]

Grenier et al.

[11] Patent Number: 4,895,227
[45] Date of Patent: Jan. 23, 1990

[54] SPRING BRAKE UNIT AND ITS APPLICATION TO A BRAKING SYSTEM

[75] Inventors: Michel Grenier, Dampart; Jean-Etienne De La Gorce, Paris; Daniel Cieplinski, Villemomble; Gérard Leturgie, Auvers S/oise; Yvers Thurin, Sucy en Brie; Laurent Meret, Brunoy; Christian Doireau, Paris, all of France

[73] Assignees: Wabco Westinghouse Equipements Ferroviaires, Sevran; Regie Autonome des Transports Prisiens "RATP", Paris, both of France

[21] Appl. No.: 20,071

[22] Filed: Feb. 27, 1987

[30] Foreign Application Priority Data

Feb. 28, 1986 [FR] France ................ 86 02817

[51] Int. Cl.⁴ .............. B60T 13/04; B61H 11/14
[52] U.S. Cl. .................. 188/173; 188/156; 188/153 A; 188/106 F; 188/106 P; 188/361
[58] Field of Search ........... 188/173, 171, 156, 151 R, 188/152, 358, 361, 153 R, 153 A, 106 P, 106 F; 60/545, 493

[56] References Cited

U.S. PATENT DOCUMENTS 3,333,902  8/1967  Liverance et al. ............. 188/106 F
3,893,544  7/1975  Means ........................... 188/52
4,033,435  7/1977  Bayliss .......................... 188/173
4,395,883  8/1975  Melinat ......................... 60/545
4,557,355  12/1985  Wilke et al. .................. 188/173

FOREIGN PATENT DOCUMENTS 1154387  9/1983  Canada ..................... 188/151 R
0166156  1/1986  European Pat. Off. .
0235035  2/1987  European Pat. Off. .
2562957  4/1985  France .
2071796  9/1981  United Kingdom .
8300059  1/1983  World Int. Prop. O. .

Primary Examiner—Andres Kashnikow
Assistant Examiner—Mark T. Le
Attorney, Agent, or Firm—Michael N. Meller

[57] ABSTRACT

Braking unit for vehicle, of the type comprising an axial actuating helical spring maintained in release position, against its elastic reaction force, through a screw-nut system rotatively driven by an electric motor, the spring acting upon the brake through the intermediary of a hydraulic master cylinder of which the piston is axially connected to an abutment ring of the spring also mechanically connected, via a screw-nut system to the rotor of an electric motor, such an unit being applied to a spring braking system for a vehicle possibly with a built-in park brake.

7 Claims, 1 Drawing Sheet

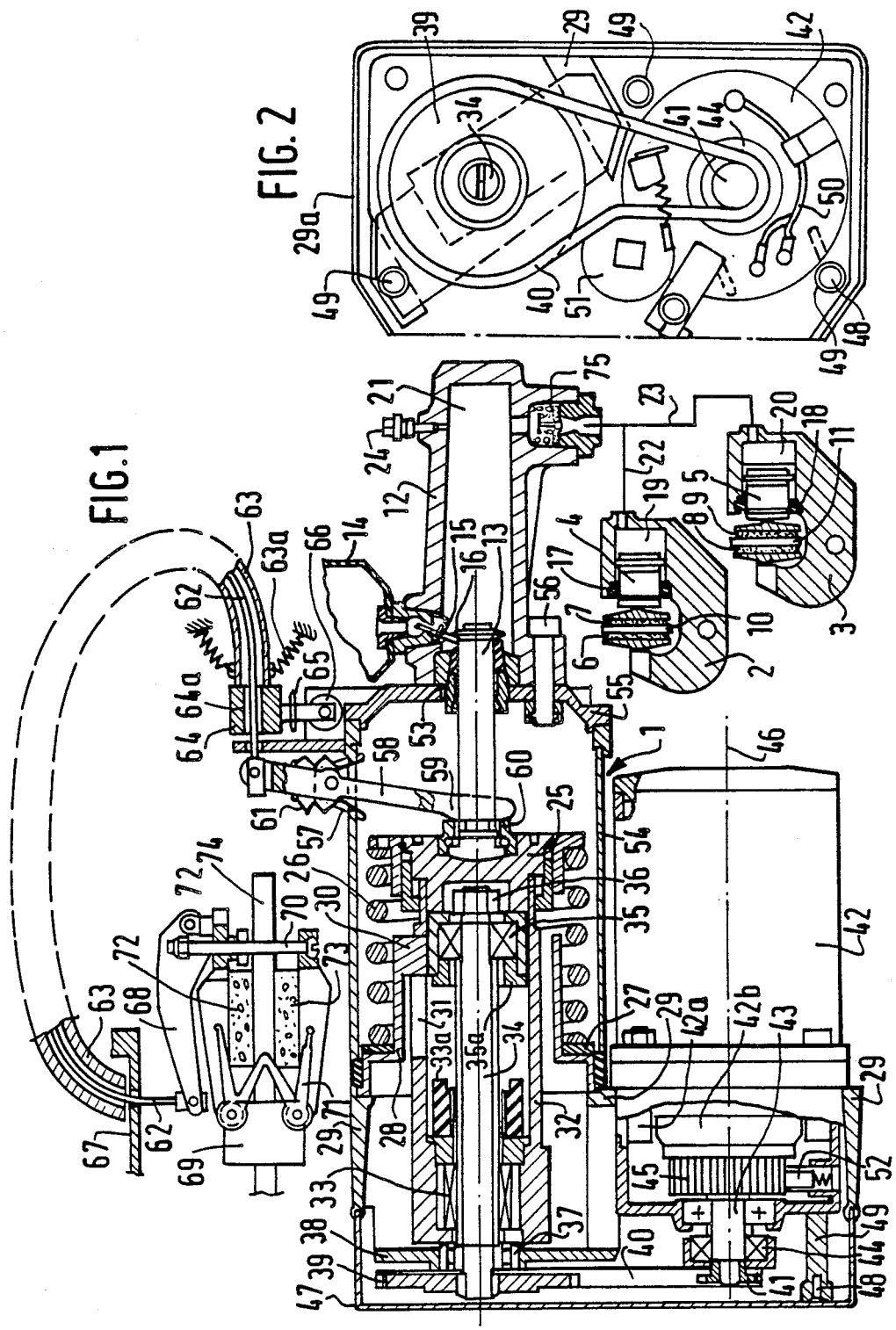

SPRING BRAKE UNIT AND ITS APPLICATION TO A BRAKING SYSTEM

BACKGROUND OF THE INVENTION

Field of the Invention

The present invention relates to a vehicle braking unit, of the type comprising at least one spring axially actuating the brake, such as a helical spring maintained in the brake release position against its reaction force through a screw-nut system adapted to be driven in rotation by an electric motor the electrical feeding current of which is adapted to adjust the braking force of the unit, constituted by the axial reaction force of the spring reduced from the subtractive force provoked by the screw-nut system rotatively driven by the electric motor. The invention also concerns the application of this braking unit to a service park, and/or emergency braking system fitted, where necessary, with anti-skid means.

In order to dispose of a spring-brake of which the release does not require the use of a pressurized fluid such as compressed air or pressurized oil, braking units have already been proposed and produced in which the brake application force is supplied by a prestressed spring such as a helical spring and the adjustable release effort is performed by an electric motor which delivers, for example, an axial release effort via a screw presenting reversibility characteristics, such as a ball screw (ball circulation worm gearing). In such a braking unit, the motor which is generally a direct current motor, with separated and constant excitation by permanent magnets, is maintained under full voltage in brake release position. The progressive brake application is achieved through progressive decrease of the motor voltage, i.e. according to the most widely used adjustment method, of the direct current flowing through the rotor windings of the motor.

The brake application force is thus the result of the difference between on the one hand, the reaction force of the spring considered as constant but which decreases slightly with the return stroke of the spring, and theoretically slightly decreases in time as a consequence of a relaxation effect of the metal of the spring and, on the other hand, the adjustable release force (through adjustment of the motor current), transmitted by the ball screw which presents a restricted and acceptable hysteresis rate of about 10%.

These braking units which present the advantages of spring brakes with respect to operating security due to the fact that it is always possible to interrupt the release effort and has the facility of placing in long term park position through cutting out of the release current, are used on vehicles where, for reasons of bulkiness ad facility of maintenance, it is desired to suppress the need of a pressurized fluid source for the braking, while changing to "all electric" piloting of the brakes. However, the braking units must be placed immediately adjacent to the braking surfaces upon which they act and which are constituted generally by the lateral faces of a brake disc and the important volume of electric motor, spring and slack adjusting means between the braking surfaces and the brake linings generally lead to a bulky assembly which is very difficult to house within the bogie chassis of light railway stock such as street cars, or rapid vehicles such as high speed trains, which are more adapted to receive high security braking units with "all electric piloting".

One of the objects of the present invention is specifically to offer a braking unit which allows to retain the qualities of the spring brake released by an electric motor and which can be housed more easily in the chassis or the bogie of the vehicle while acting simultaneously on several braking surfaces such as those of multiple discs brake of a high-speed railroad bogie.

SUMMARY OF THE INVENTION

According to the invention, the spring is connected to the brake through the intermediary of at least a hydraulic master cylinder of which the piston is axially actuated by an abutment ring of the spring, this ring being mechanically connected via the screw-nut system to the rotor of the electric motor and at least a hydraulic fluid connector of the master cylinder is connected to at least one receiving cylinder of which the piston is adapted to apply at least one brake lining of the brakes on a braking surface of the vehicle wherby there us a remote connection between the actuating spring and the brake lining by means of a hydraulic fluid column which is adapted to transmit and to transform the axial reaction force of the actuating spring and which presents, where necessary, a variable volumn adapted to adjust the application slack of the brake lining.

The brake unit can be constituted, on the one hand, by a mechanical-hydraulic assembly containing the screw-nut system and the operating spring and at one end of which is mounted the master cylinder and, on the other hand, of an electrical assembly constituted by a rotary electric motor of which the rotor is connected to a driving member for during the nut of the screw of the screw-nut system.

The mechanical-hydraulic assembly and the electrical assembly are mounted parallely with respect to each other on a transmission bracket in which is disposed a flexible transmission member, comprising where necessary a demultiplication, between the driving member and the screw or the nut of the screw-nut system such as a chain or a belt, in such a manner as to reduce the length of the control unit, or in an alternative, the mechanical-hydraulic assembly and the electrical assembly are mounted in series in such a manner that the rotor of the electric motor is directly coupled to the nut or to the screw of the screw-nut system, so as to reduce the bulkiness diameter required for the braking unit. When the operating spring is a helical spring, the screw-nut system is housed at least partially within the helical spring.

According to one embodiment of the invention ensuring supplementary safety, the abutment ring is mechanically connected to a mechanism for actuating an emergency and/or park brake of the vehicle adapted to replace at least provisionally the master cylinder in the case of it being defective. The mechanical connection between the abutment and the actuating mechanism is constituted by a lever articulated on an axle integral with the unit body and of which one end rests upon the abutment ring of the actuating spring while the other end is connected to a cable of a cable and sheath system for actuating the emergency and/or park brake of which the sheath is adapted, respectively, in the application position of the emergency brake, to be in abutment on a rigid abutment and, in the inactive position of the emergency and/or park brake, to be released in order to allow the service brake to act freely via the hydraulic master cylinder. The rigid abutment is movable and adapted, either to be returned in the active position, or to be brought into the inactive position, releasing the sheath, by a remotely controlled member such as a fluid cylinder or an electric motor.

According to another embodiment, the hydraulic master cylinder is provided with pre-stroke means adapted to provoke an initial emission of hydraulic fluid at a high flow-rate under reduced pressure in order to carry out the initial approach of the brake linings on the braking surfaces and to seal up by a checkvalve the braking circuit once the application pressure on the linings exceeds the maximal pressure possible for the high flow-rate circuit, in such a manner as to improvedly use the energy of the actuating spring to apply the brake linings on the braking surfaces.

When the brake control block according to the invention is applied to a park braking system, the electric motor is also adapted to be electrically powered in order to be driven in rotation in counter direction prior to a parking operation, i.e. in the direction in which the screw-nut system provokes on the abutment ring of the operating spring a supplementary force on the master cylinder which is added to the elastic reaction force of the actuating spring, in such a manner as to provoke a supplementary application force on the brakes and to reverse in parking situation the hysteresis of the screw-nut system after cutting out the reverse electric current on the electric motor.

In an alternative, the electric motor is also adapted to be driven in rotation in the counter direction in emergency braking situation of the vehicle, in such a manner as to provoke a supplementary braking application force corresponding to the emergency braking.

When the brake unit is included within a braking system equipped with anti-skid means, i.e. temporary releasing of the brakes in the case where there is a trend of blocking at least one wheel of the vehicle braked by this unit, the electric motor is adapted to be fed during the temporary release or "anti-skid" phases by a release current greater than the normal total release current of the brakes, in such a manner as to accelerate the release rotation of the screw-nut system during the "anti-skid" release phases of the brakes.

According to another alternative of the method of use of the braking blocks according to the invention, in order to obtain a total release of the brakes, the electric motor is fed during the release phase per se with an electric current greater than that necessary to obtain the compression of the actuating spring in release position of the brakes, then after this release, is fed with an electric current lower than that necessary for ensuring this compression of the spring but sufficient to maintain the brakes in full release position by using the hysteresis friction of the screw-nut system, in such a manner as to decrease the heat or thermal charge of the electric motor in the released brake position.

BRIEF DESCRIPTION OF THE DRAWING

Other aims, advantages and objects of the present invention will become apparent from the following description of an embodiment of the invention, given by way of non-limitative illustration and with reference to the appended drawings in which:

FIG. 1 is a schematic representation in cross-section of the braking unit according to the invention, connected to disc brake calipers and to a parking and/or emergency brake operating system in order to constitute a braking system for a railroad bogie;

FIG. 2 is a partial side view (especially without the park brake control), rear cover removed, of the braking unit represented at FIG. 1.

DESCRIPTION OF THE PREFERRED EMBODIMENTS

The brake unit 1 represented at FIG. 1 is intended principally to actuate hydraulically controlled brake calipers 2 and 3 of which the pistons 4 and 5 apply, under the effect of a hydraulic pressure, brake linings 6, 7 and respectively 8, 9 on the braking surfaces of brake discs 10 and 11. The hydraulic pressure is generated by a master cylinder 12 of a known type, for example with a plunger 13 and which is adapted to be supplied in hydraulic fluid from a fluid reservoir 14 through a check valve 15 maintained in open position by a flange 16 of the plunger 13, when this latter is in inactive or withdrawn position. In order to perform automatic slack adjusting, the pistons 4 and 5 of the calipers 2 and 3 cooperate, for example with rubbing and springy means 17 and 18, such as resilient segments and/or washers, that are opposed to the withdrawal of the pistons 4 and 5 beyond the normal slack value when these pistons have advanced due to wear of the brake linings or of the friction surfaces of the discs 10 and 11. The hydraulic or pressure chambers 19 and 20 of the brake calipers 2 and 3 are connected to the pressure chamber 21 of the master cylinder by connecting lines 22 and 23 which present flexible portions allowing a displacement between the master cylinder 12 and the brake calipers that can be of any number, corresponding for example to the number of brake discs of a railroad bogie, number that can reach eight on the bogies of high-speed-train (HST) but can be limited to two in the case of a motor bogie intended for a rapid transit vehicle of the metro or street car type.

Air drain means for bleeding the hydraulic circuit are provided on the upper parts of the circuit, especially the hydraulic chamber 19 and 20 of the calipers and the pressure chamber 21 of the master cylinder 12 (only the bleeding screw 24 of the master cylinder 12 has been represented).

According to the invention, the plunger 13 of the master cylinder 12 is connected by an end abutment ring 25 to an axial actuating spring 26 constituted, in the present example, by a preset helical spring abuting by its other end via a setting ring 27 on a abutment tube 28 itself abuting on a support body 29 of the braking unit 1. The abutment tube 28 is extended in the direction of the end abutment ring 25 by guiding fingers 30 (a single finger is represented in cross-section) which are housed in guiding grooves 31 (a single groove is represented in cross-section) of a return tube 32 which carries, at its other end on the side of the plunger 13, the abutment ring 25. The other end of the return tube 32 carries a ball nut 33 (recirculation ball worm gearing) schematically represented on FIG. 1 and which cooperates with a ball screw 34 (a worm presenting a helical groove in which roll the balls in continuous rolling via a return rolling track) which is extended over the entire length of the return tube 32. The ball screw 34 is rotatively mounted between two bearings one of which 35 is carried by the guiding fingers 30 (being at minimum number of three in order to ensure correct centering) and maintained in place by a blocking nut 36 of the ball screw 34.

The other guide bearing 37 of the ball screw 34 is carried by a flange 38 of the body support 29, beyond which the ball screw 34 is rendered integral, for example by keying, with a sprocket wheel 34 rotation of the screw 34. The wheel 39 is coupled by a chain 40, to the outlet sprocket 41 of an electric motor 42. The connection between the sprocket 41 and the shaft 43 of the electric motor is obtained, for example, by a unidirectional free-wheel 44 whose function will be fully described herein-below. The electric motor, which in the present example is a commutator direct current motor 45, is flangedly mounted on the support body 29 with its axis parallel to the axis of the ball screw 34.

FIG. 1 shows that the chain connection mechanism between the ball screw 34 and the electric motor 42 is covered in a sealed manner by a cover 47 applied to an edge 29a (FIG. 2) of the support body 29 through the intermediary of screws 48 attached onto protrudings 49 of this body. On the side view of FIG. 2, where the cover 47 has been removed, the electrical connections 50 of the electric motor 42 and the chain drawing device 51 are represented. It will be understood from FIGS. 1 and 2 that when the voltage is applied onto the electric motor 42 (constituted in the present example by a permanent magnets stator 42a and a rotor 42b fed with adjustable direct current through the intermediary of the commutator 45 and of brushes 52 only one of which is represented) it allows to have the ball screw 34 rotated in the direction that compresses the spring 26 in order to release the brakes.

The axial displacement mechanism constituted by the spring 26, the ball nut 33, the ball screw 34, the return tube 32, the abutment ring 25 and the plunger 13 that crosses a sealed bearing 53, is housed in a cylindrical guard 54 flanged on the support 29 and which is extended by a closing flange 55 carrying the sealed bearing 53 of the plunger 13 and on which is rigidly attached by screws 56 the master cylinder 12. In the vicinity of the flange 55, the guard 54 carries an external bracket 57 on which is pivoted an emergency or park braking lever 58 which is bearing through a fork 59 on a bearing 60 of the abutment ring 25. The lever 58 crosses in a sealed manner the guard 54 by means of an elastic bellow 61 and its end external relative to the guard 54 is hinged to a cable 62 adapted to slide in a sheath 63 flexible in bending and relatively rigid in compression and which abuts, on the side of the lever 58 on an abutment 64 rotating around an axle 65 (in the plane of FIG. 1) and controlled by a piston 66 (its axis is perpendicular to the plane of FIG. 1) and respectively, on the opposite side, on a fixed abutment 67. The sheath is rushed onto the fixed abutment 67 by return springs or similar 63a.

The cable 62 is connected to the application lever 68 of a park brake caliper 69 combined to a threaded connecting rod 70, to a release spring 71 and to brake linings 72 and 73 in order to constitute, with a brake disc 74, an emergency or park brake. In the case where it is desired to use a high power park braking for a railway bogie, it is possible to use a disc 74 mechanically connected to the axle transmission by a high demultiplication (for example connected directly to the axle of the driving electric motor) and brake linings 72 and 73 having a high rubbing coefficient such as brake linings made of elastomer. When the park brake does not have to be actuated, the piston 66 is subjected to the action of a pressurized fluid or a spring (safety solution) and causes the support 64 to pivot around the axle 65, in such a manner that the sheath 63 turned by the springs 63a does not have an abutment point and that the cable 62 is not actuated against the release spring 71 when the fork 59 of the lever 58 is driven towards the right-hand side of the figure.

The relatively heavy breaking unit 1 is attached onto the chassis of the bogie or of the vehicle and is connected by flexible conduits to the brake calipers (through brake hoses) and respectively by the flexible cable and sheath system to emergency brake calipers.

The operating of the brake unit and system which is described herein-above will now be explained. In normal service of the vehicle on which is mounted the braking unit, the service and park or emergency brake is released by putting under voltage the motor 42 which, from a position of applied brake, drives in rotation via the free wheel 44, the sprocket 41 and in counter direction, through the intermediary of the chain 40, the wheel 39. The ball screw 34 is thus driven in rotation with a torque multiplied by the ratio of the diameters of the sprocket wheel 39 and of the sprocket 41, in the direction which pushes the ball nut 33 towards the left-hand side of the figure by compressing the spring 26 until abutment position (the abutment has not been represented on the figure) corresponding to that represented in FIG. 1. In this release position of the brakes, the flange 16 of the plunger 13 opens the check valve 15, thereby connecting the hydraulic chambers 19 and 20 of the brake calipers to the hydraulic fluid tank 14 and puts the hydraulic circuit at atmospheric pressure. The brake linings 6-9 of the brake calipers 2 to 3 are maintained close to the braking surfaces of discs 10 and 11 with a small slack due to the high friction of the rubbing and springy means 17 and 18. As long as sufficient electric intensity flows through the motor 42 to oppose, with the rubbing forces, to the rotation of the sprocket 41 in counter direction under the effect of the reaction force of the spring 26, this spring 26 remains compressed and the brake is released.

In order to obtain a brake application, the electronic and electric control circuit for the electric supply of the motor 42 provokes a decrease in the power supply of the rotor of this motor up to a value lower than that sufficient to maintain, with the friction forces the spring 26 in the compressed position represented in the figure. The spring 26 which can no longer be retained by the torque of the motor 42 is thus driving the screw 34 in rotation in the counter or reverse direction relative to the motor torque and moves towards the right-hand side of the figure by pushing the plunger 13 inside the pressure chamber 21 of the master cylinder 12. The check valve 15 closes, isolating the hydraulic circuit that rises in pressure and applies, through the intermediary of pistons 4 and 5 of the calipers, the brake linings 6 to 9 on the braking surfaces of the brake discs 10 and 11. The pistons 4 and 5 usually have diameters greater than that of the plunger 13, which allows to amplify several times the reaction force of the spring 26 on each of the brake linings. When the pressure prevailing in the hydraulic circuit is balanced, with the torque remaining on the shaft 43 of the motor 42, by the reaction force of the spring 26 that decreases slightly with the expansion of said spring, the displacement of the plunger 13 is interrupted in a balanced position. During the displacement of the spring 26, the abutment 60 of the abutment ring 25 is applied on the fork 59 and causes the lever 58 to pivot, but this does not generate the displacement of the lever 68 against the release spring 71 of the parking brake, since the support 64 is removed and a traction on the cable 62 is converted into a displacement of the sheath 63 against the return springs 63a.

In order to increase the braking forces, a further reduction of the release intensity that flows through the windings of the rotor 42b, at a rate sufficient to overcome the hysteresis rubbings of the ball nutscrew assembly provokes a fresh displacement towards the right of the plunger 13. In order to provoke effective release of the brakes, it is necessary to increase the current intensity that flows through the windings of the rotor of the motor by a value great enough to overcome the mechanical hysteresis of the spring system and of the ball screw-nut assembly. The spring 26 is thus compressed by a supplementary value and the plunger 13 is displaced towards the left of the figure, thereby increasing the volume of the hydraulic circuit and provoking by expansion a decrease of its pressure. It will be noted that the hydraulic circuit is isolated in a conventional manner, on the side of the receivers constituted by the brake calipers, by a residual pressure valve 75 which maintains the receiver circuit in slight overpressure when it is released in order to prevent stray air from re-entering, by pressing the lips of the seal linings on their bearings.

In order to carry out a park braking, the parking brake is first of all activated by bringing, through the piston 66, the abutment support 64 into the position represented in FIG. 1, which is possible in released brake position since the springs 63a return the sheath 63 of the cable 62 and the face of the support 64 on which abuts the sheath can present a slight slope which allows the abutment 64 to act as a wedge which pushes the sheath 63 through the pivoting effect imposed by the piston 66. The cable 62 is housed in a slot 64a of the abutment. In order to complete the park braking action, the electric current is cut-out in the winding of the rotor 42b and the completely freed spring 26 pushes the plunger 13 towards the right of the figure by provoking the full application of the disc brakes by the calipers 3 and 4 and a slight tightening of the disc 74 by the lever 68 since the sheath 63 arrives in abutment on the abutment support 64, once the fork 59 of the lever 58 pivots towards the right. It should be understood, in fact, that taking into consideration the small slack that exists between the service brake linings 6 to 9 and the corresponding brake discs 10 and 11, it is sufficient to have a small travel of the plunger 13 towards the right of the figure in order to provoke a full application of the service brake.

If an oil leak occurs during the parking of the vehicle, most often through the check valve 15, the plunger 13 is displaced very slowly towards the right until the rubber abutments 33a of the ball nut 33 abuts on the abutment ring 35a of the ball bearing 35 of the screw 34, or until the abutment of the plunger 13 on the bottom of the hydraulic chamber 21. With a right adjustment of the threaded connecting rod 70 of the park brake caliper 69, the park brake is applied completely by the cable 62 and it is the fork 59 that stops the spring 26 in its displacement towards the right of the figure by transmitting to the park brake having a high rubbing coefficient, the whole of the reaction effort of the spring 26. A mechanical force of transmission by levers and cable and sheath system thus replaces the hydraulic transmission in the case of its deficiency during park braking. In the case where a complete service braking is actuated by cutting out the electric current of the rotor while the hydraulic circuit is defective, for example following the rupture of a connecting hose to a brake caliper, the spring 26 expands suddenly driving the rotor 42b of the motor 42 in rotation at high speed and at the moment of the sudden contact between the rubber abutments 33a and the ring 35a, the interruption of the rotation of the rotor 42b would provoke the rupture of the chain 40 if the unidirectional free wheel 44 was not interposed between the shaft 43 of the motor and the sprocket 41. Due to this free wheel 44, upon the sudden halt of the rotation of the screw 34 and of the sprocket 41, the rotor 42b of the electric motor continues to rotate thus preventing the rupture of the chain 40.

Numerous adaption and applications alternatives of the braking unit according to the invention are possible. The chain can be replaced by a belt in order to provide more elasticy to the transmission and to ensure thereupon a kind of torque limitation allowing to suppress the free wheel 44. The motor 42 can be a motor of a type other than a direct current motor with shunt excitation by magnets, especially an asynchronous or synchronous-asynchronous induction motor or step by step motor. The hydraulic receivers can be of various and mixed types, for example for shoe brake and disc brake with intermediate pressure proportioning valves.

The braking unit 1 comprises two assemblies having different functions: on the one hand, a mechanical-hydraulic assembly containing the screw-nut system which is not necessarily the ball type and the actuating or operating spring 26 as well as the hydraulic master cylinder 12 that can be simple or multiple, in series or parallel mounting and on the other hand, an electric assembly of which the rotor 42b is mechanically connected to the nut or to the screw of the screw-nut assembly. The hydraulic mechanical assembly and the electrical assembly can be mounted parallely with respect to each other such as represented on FIG. 1, in such a manner as to reduce the length of the control block. With the same purpose, the screw-nut system is housed as far as possible inside the helical spring 26 as possible which can be constituted by several stacked springs or springs in parallel, or be replaced by a stack of Belleville washers.

According to another embodiment (not represented), the hydraulic mechanical assembly and the electrical assembly are mounted in series in order to reduce the transversal bulkiness of the unit which has thus the general form of an elongated cylinder. The mechanical connection between the rotor of the electric motor and the screw-nut assembly is obtained through direct coupling of the motor or via a reducing gear, preferably epicyloidal, in order to obtain increased compactness.

According to one particular advantageous embodiment, the hydraulic master cylinder is for instance of the type disclosed in French Pat. published under no. 2,562,957, i.e. is provided with prestroke means adapted to provoke an initial emission of the hydraulic fluid at a high flow-rate under reduced pressure, in order to carry out the initial approach of the brake linings 6, 9, on the braking surfaces 10, 11 and to seal by a check valve the braking circuit once the application pressure of the linings 6-9 exceeds the maximal pressure possible for the high flow-rate circuit, in such a manner to improvedly use the energy of the actuating spring 26 for application of the brake linings 6-9 on their braking surfaces 10, 11. It is thus possible to allow more slack between the brake linings 6-9 and the braking surfaces without having to increase the stroke of the actuating spring 26.

By suppressing in one way or another the free wheel 44, the electric motor 42 can be powered in order to be driven in rotation in counter direction prior to a parking operation, i.e. in the direction where the screw-nut system 34, 33 provokes on the end abutment ring 25 of the actuating spring 26 a supplementary application force on the master cylinder 12, which adds to the resilient reaction effort of the actuating spring 26, in such a manner as to provoke a supplementary application force of the brakes and to reverse, in parking situation, the hysteresis of the screw-nut system 34, 33 after cutout of the inverse electric motor on the electric motor 42. The electric motor 42 is also adapted to be rotated in counter direction in a situation of emergency braking of the vehicle, in such a manner as to provoke a supplementary braking force corresponding to the emergency braking. When the braking system is fitted with anti-skid means allowing a temporary release of the brakes in case of a blocking trend of at least one vehicle wheel braked by this braking unit 1, the electric motor 42 is adapted to be supplied during the temporary release phases or "anti-skid" phases by a release current higher than the normal current of total release current of the brakes, in such a manner as to accelerate the release rotation of the screw-nut system 34, 33 during these "anti-skid" release phases of the brakes.

In order to ensure total release of the brakes, the electric motor 42 can be supplied during the release phase with an electric current higher than that necessary for ensuring the compression of the operating spring 26 in total release position of the brakes, then after this release, can be supplied with an electric current lower than that necessary to ensure this compression of the spring, but sufficient to maintain the brakes in total release position by using the hysteresis friction of the screw-nut system 34, 33 in such a manner as to reduce the permanent heat charge of the electric motor in released brake position.

The application methods of the braking unit to the various service conditions that have been described herein-above, are also applicable to a unit with a spring brake that is released by an electric motor where the transmission of the forces is carried out by direct mechanical transmission without use of a transmission and slack adjusting hydraulic circuit. the hydraulic transmission braking unit according to the invention is relatively heavy and bulky, but presents a high power sufficient to actuate all the brake shoes of a railroad bogie. According to the most advantageous embodiment, the braking unit is housed in the bogie chassis in a space disposing of sufficient place and the hydraulic conduits presenting hose portions connect it to the various relatively light weight pressure receivers that are disposed on the various brake actuating devices and that are all adapted to be connected to the unit by flexible transmissions including the park and emergency brake that is connected, as seen herein-above, by a cable and sheath system adapted to match curves.

It is well understood that the present invention is in no way limited to the embodiments described and represented herein-above, but can be adapted to numerous variants available to the man skilled in the art without departing from the scope and spirit of the invention.

What is claimed is:

1. A braking unit for a vehicle, of the type comprising at least one helical spring arranged to axially actuate a brake, said spring being maintained in a brake release position against its reaction force via a screw-nut system adapted to be driven in rotation by an electric motor which is powered to adjust the braking force of the unit, constituted by the axial reaction force of the spring reduced by the subtractive force produced by the screw-nut system rotationally driven by the electric motor, the spring being connected to the brake through the intermediary of at least a hydraulic master cylinder, the piston of which is axially activated by an abutment ring of the spring, the abutment ring being mechanically connected via the screw-nut system to the rotor of the electric motor and the master cylinder being branched to at least one receiving cylinder, piston of which is adapted to apply at last one brake lining the brakes on a braking surface of the vehicle, the abutment ring being also mechanically connected to a mechanism for actuating an emergency or park brake of the vehicle adapted to replace at last provisionally the master cylinder if it becomes defective, wherein the mechanical connection between the abutment and the actuating mechanism is constituted by a lever articulated on an axle integral with the unit body and one end of which rests upon the end abutment ring of the actuating spring while the other end is connected to a cable of a cable and sheath system for actuating the emergency or park brake, wherein the sheath is respectively adapted, in the application position of the emergency or park brake, to abut a rigid abutment and, in the inactive position of the emergency or park brake, to be released in order to allow the service brake to act freely via the hydraulic master cylinder and wherein the rigid abutment is movable and adapted either to be returned to the active position or to be brought into the inactive position, thereby releasing the sheath, by a remotely controlled member.

2. The braking unit according to claim 1, wherein said remotely controlled member comprises a fluid cylinder.

3. The braking unit according to claim 1, wherein said remotely controlled member comprises an electric motor.

4. The braking unit according to claim 1, wherein the electric motor is also adapted to be electrically powered in order to be driven in rotation in a counter direction prior to a parking operation, which is in the direction in which the screw-nut system produces on the abutment ring of the operating spring a supplementary force on the master cylinder which is added to the elastic reaction force of the actuating spring, in such a manner as to produce a supplementary application force on the brakes and to reverse in a parking situation the hysteresis of the screw-nut system after cutting out the reverse electric current on the electric motor.

5. The braking unit according to claim 1, wherein the electric motor is also adapted to be driven in rotation in the counter direction in an emergency braking situation of the vehicle, in such a manner as to produce a supplementary braking application force corresponding to the emergency braking.

6. The braking unit according to claim 1 equipped with an anti-skid means which is a means for temporarily releasing of the brakes in the case where there is a trend of blocking at least one wheel of the vehicle braked by this unit, wherein the electric motor is adapted to be fed during the temporary release or "anti-skid" phases by a release current greater than the normal total release current of the brakes, in such a manner as to accelerate the release rotation of the screw-nut system during these "anti-skid" release phases of the brakes.

7. The braking unit according to claim 4, wherein in order to obtain a total release of the brakes, the electric motor is fed during the release phase with an electric current greater than that necessary to ensure the compression of the actuating spring in a release position of the brakes, and after this release, is fed with an electric current lower than that necessary for ensuring this compression of the spring but sufficient to maintain the brakes in a full release position by using the hysteresis friction of the screw-nut system, in such a manner as to decrease the heat or thermal charge of the electric motor in the released brake position.

* * * * *